United States Patent [19]
Egly

[11] 4,225,038
[45] Sep. 30, 1980

[54] MAGNETIC DISK STORAGE CASE

[76] Inventor: Robert A. Egly, 1630 Marguerite, Corona del Mar, Calif. 92625

[21] Appl. No.: 932,532

[22] Filed: Aug. 10, 1978

Related U.S. Application Data

[63] Continuation of Ser. No. 834,488, Sep. 19, 1977, abandoned.

[51] Int. Cl.³ .............................................. B65D 85/00
[52] U.S. Cl. ............................. 206/45.18; 206/425; 206/472; 220/339
[58] Field of Search ............................. 220/339, 343; 206/45.15, 45.17, 45.18, 45.2, 45.23, 18, 39.3, 301, 425, 444, 478, 480, 482, 486, 472, 475, 450, 476, 555, 565, 576

[56] References Cited

U.S. PATENT DOCUMENTS

| | | | |
|---|---|---|---|
| 701,658 | 6/1902 | Wixcel | 190/16 |
| 1,178,690 | 4/1916 | Tamis | 206/39 |
| 1,736,384 | 11/1924 | Wright | 206/555 X |
| 1,811,164 | 6/1931 | Wilson | 206/45.18 X |
| 1,944,714 | 1/1934 | Lehman | 206/45.17 |
| 1,960,073 | 5/1934 | Warner | 206/45.15 |
| 2,567,564 | 9/1951 | Ingraham | 206/18 |
| 3,003,997 | 10/1961 | Intermill | 206/45.18 |
| 3,162,997 | 12/1964 | Schmidt | 206/45.18 X |
| 3,177,991 | 4/1965 | Walker | 190/11 |
| 3,360,116 | 12/1967 | Somers et al. | 206/45.2 |
| 3,373,892 | 3/1968 | Landen | 220/343 |
| 3,892,309 | 7/1975 | Coffey et al. | 206/565 X |
| 4,011,940 | 3/1977 | Neal et al. | 220/339 X |
| 4,091,918 | 5/1978 | Soulakis et al. | 206/45.18 X |

FOREIGN PATENT DOCUMENTS 14174  9/1933  Australia .................................. 206/425

Primary Examiner—Stephen Marcus
Attorney, Agent, or Firm—George F. Bethel; Patience K. Bethel

[57] ABSTRACT

A magnetic disk and card storage enclosure is described in the following specification configured as a book-like pair of overlying covers that are hinged along a side analogous to a binding. One of the covers has a pivotal tray-like insert connected thereto that can be laid within the enclosure formed between the two covers. The tray-like enclosure can store disks in their entirety or be divided with a wall to provide two adjunct compartments for rectangular magnetic cards. The other cover which is not connected to the insert has a ledge or side wall therearound which forms an internal cavity or enclosure for the entire insert to be laid therein and enclosed when the top and bottom covers are laid in overlying relationship to each other. The insert has a pair of flexible fan tabs which can receive the magnetic disks or cards therebehind for spreading them in a flexible and facile manner. The entire case can be formed from plastic with living hinges for opening and closing the case.

8 Claims, 11 Drawing Figures

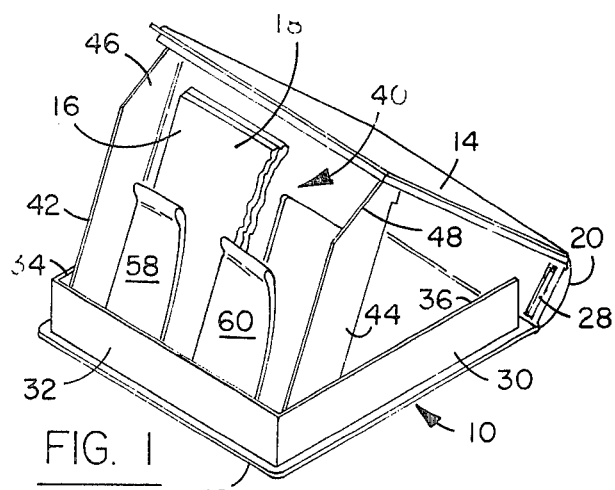
FIG. 1
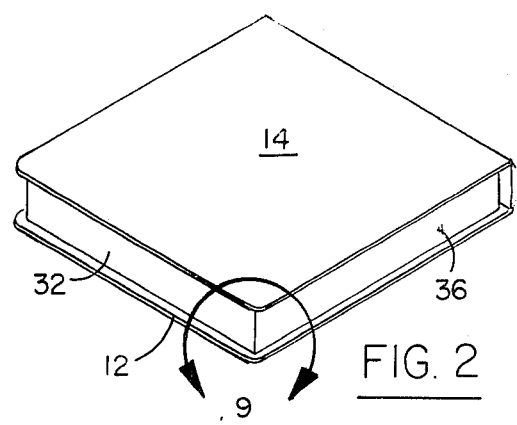
FIG. 2
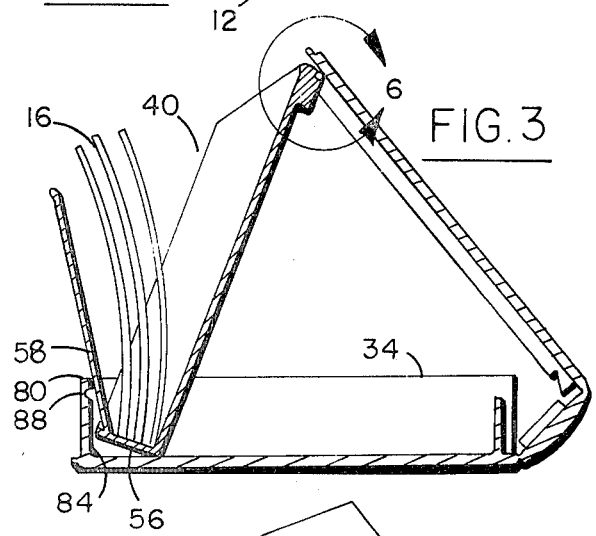
FIG. 3
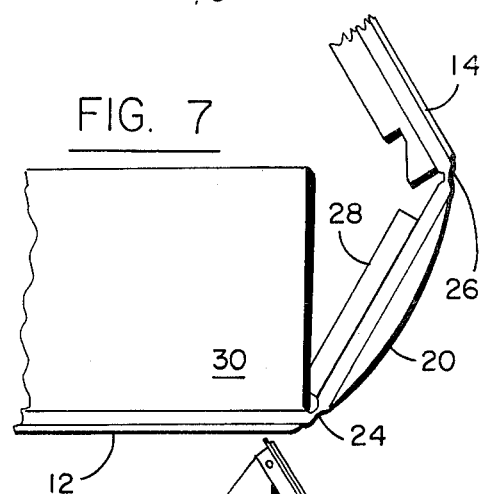
FIG. 7
FIG. 4
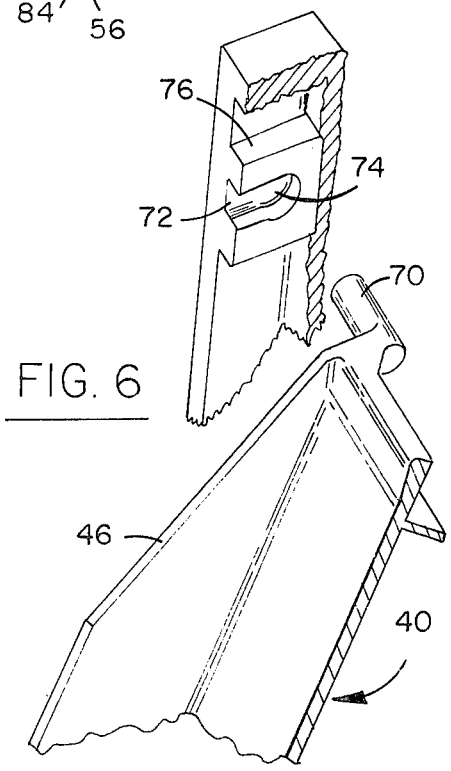
FIG. 6
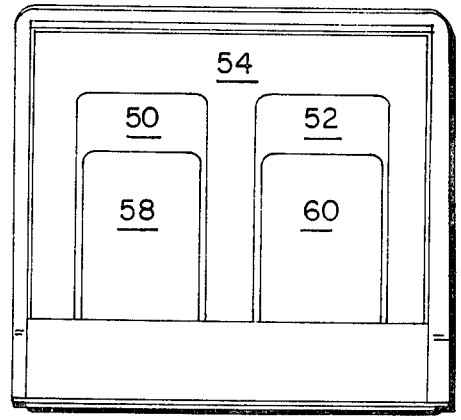
FIG. 5

MAGNETIC DISK STORAGE CASE

This case is a continuation of my previously filed case for a Magnetic Disk Storage Case, filed Sept. 19, 1977 bearing Ser. No. 834,488, now abandoned.

BACKGROUND OF THE INVENTION

1. Field of the Invention

The field of this invention lies within the computer, magnetic card and magnetic disk art. In particular, it lies within the magnetic disk and magnetic card storage art, wherein magnetic disks and magnetic cards are to be stored and/or indexed for later use within a memory drive, such as a disk drive reader or word processing typewriter.

2. The Prior Art

The prior art related to magnetic disk and magnetic card storage has been provided in various forms of storage that were casual at best. In particular, some of the disks and cards were stored loosely and left to lie around. In this manner, the disks gathered dust and dirt and were often damaged.

Recently, certain attempts have been made to store magnetic disks and cards in their containers by binding them at the edges. Furthermore, certain boxes have been designed in the form of cardboard boxes to receive the disks and cards in a stacked configuration.

All of the foregoing disk and card storage means have been inordinately cumbersome and fragile. This invention overcomes the fragility as well as the cumbersome nature of prior storage means, enabling a user to make use of stored disks and cards in a facile and ready manner. This is accomplished by way of a unique storage system that will be amplified upon hereinafter.

The disk and card storage container of this invention incorporates a pair of covers. One of the covers has a wall or ledge around it that serves to provide the side walls of the container when the covers are placed in overlying relationship. The upper cover serves the function of providing not only a cover, but also a pivotal support for a tray-like insert to be described hereinafter, A tray-like insert is hinged to one of the covers by means of a pintal or living hinge. The insert has a pair of fan tabs overlying the tray configuration that can be utilized to receive a series of disks or cards therebehind. In this manner, the tray holds the memory disks and cards in a stacked and substantially upright position. The tray-like insert has side walls which also serve to prevent lateral displacement of the disks or cards stored therein. When cards are to be stored, an alternative divider wall can be used between the cards.

The fan tabs or the insert allow for a fanning or opening up of the disks or cards that are stored therein, so that their respective numbers or titles can be read.

The entire enclosure can be formed of plastic with living hinges so that the end result is a strong durable plastic container that can be formed through a molding process to provide disk or card storage in a readily accessable form.

SUMMARY OF THE INVENTION

In summation, this invention comprises a foldable enclosure having a tray-like insert therein for easy access to magnetic storage disks or cards.

More particularly, the invention incorporates a cover having a ledge or side wall therearound which is normally the base of the enclosure when it is in the open position. An upper cover is incorporated which folds in a book-like manner onto the lower cover and supports the tray-like insert.

The insert is pivotally supported on the upper cover by means of a pintal so that it can swing backwardly and forwardly. In the closed position it can rest against the inside surface of the upper and lower covers. In the open position, it can be placed against the lower cover within the walls or ledge therearound.

The tray-like insert has a pair of fan tabs and side walls which prevent the magnetic storage disks or cards from excessive movement or sliding therein. The magnetic storage disks or cards can be reviewed by merely spreading apart the tabs so as to fan through the magnetic storage disks and ascertain the number or title with respect to each one.

The entire enclosure, including the top and bottom covers, can be folded inwardly, thereby allowing the tray-like insert to be implaced and secured therebetween. The top and bottom covers and side walls of the bottom cover form a complete enclosure for the magnetic storage disks or cards in the tray-like insert. When magnetic cards are to be stored, the tray-like insert is divided by a wall to form two adjoint pockets into which the cards can be implaced.

The foregoing enclosure is provided with living hinges between the top and bottom covers in the form of a web or binding for the enclosure, thereby making the enclosure a flexible and readily manufactured device by means of a plastic molding or forming process.

BRIEF DESCRIPTION OF THE DRAWINGS

The invention will be more clearly understood by reference to the description below taken in conjunction with the accompanying drawings wherein:

FIG. 1 shows a perspective view of the magnetic storage disk enclosure of this invention in an open position with a series of fragmented magnetic storage disks implaced therein;

FIG. 2 shows the enclosure of FIG. 1 in its folded relationship with the insert therein folded backwardly and the top cover folded downwardly in overlying relationship to the bottom cover;

FIG. 3 shows a midline sectional view taken through the midline of the enclosure as it would be seen through the center of FIG. 1;

FIG. 4 shows a side elevation view of the enclosure with the insert moved backwardly to an overcenter position of the showing of FIG. 1;

FIG. 5 shows a front elevation view of the enclosure;

FIG. 6 shows a fragmented and sectional view of the pintal and hinge seat of this invention where the insert is hinged to the side walls of the covers as inscribed by cirle 6 of FIG. 3;

FIG. 7 shows a detailed side elevation of the living hinge between the top and bottom covers as would be seen in a side elevation veiw inscribed by circle 7 of FIG. 4;

DESCRIPTION OF THE PREFERRED EMBODIMENTS

Figure 8:
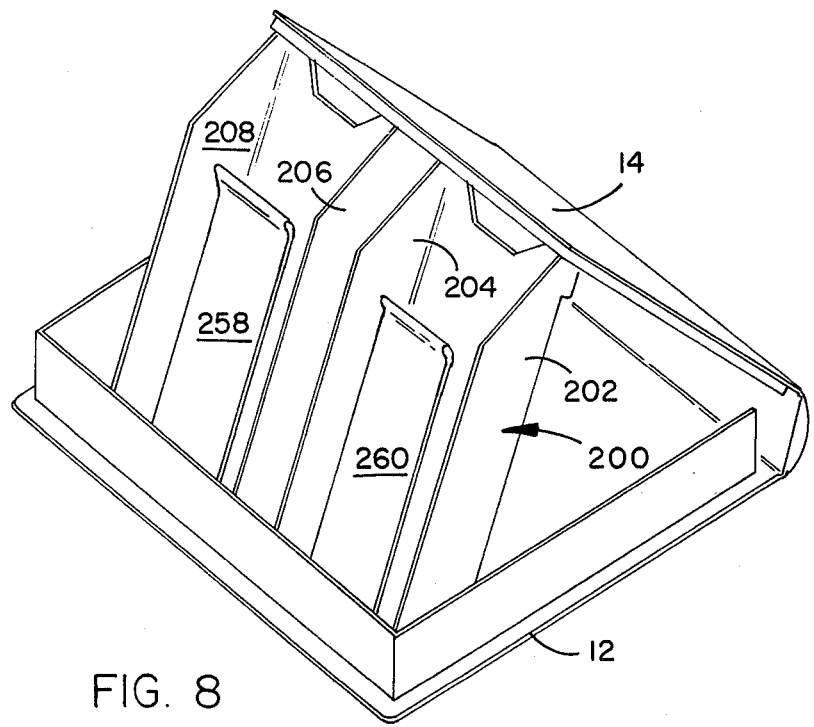
FIG. 8 shows a perspective view of the alternative embodiment employing the tray insert for magnetic cards.

Looking more particularly at FIG. 1 and the ancillary figures related thereto which constitute the remaining figures, a container or enclosure 10 is shown. The container 10 has a lower or first cover 12 and an upper or second cover 14.

The two respective covers 12 and 14 are generally placed in an angular upper and horizontal lower position when the container is open. As can be seen in FIG. 1, the container is open with a plurality of magnetic disk storage members 16 implaced therein. The magnetic disk storage members 16 are the standard disks which are sometimes referred to in the common parlance of the art as floppy disks, flexible disks, or diskettes. Regardless of the type or size of disk or diskette which is used, this container serves the function of storing them.

Generally, the disks or diskettes are enclosed within an envelope in order to prevent dirt or dust exposure and damage to the surfaces thereof. The envelopes are usually provided with a label 18 which has been shown. The label 18 describes the material that is on the disk and can be cataloged or serialized in any particular form in order to provide for ready access to the information stored on the disks.

The container 10 with the upper and lower covers 12 and 14 provides for a complete enclosure of the disks 16 when the container is closed as shown in FIG. 2. The covers 12 and 14 are secured in place by means of a web 20 or binding. The web 20 or binding is formed between the covers 12 and 14 in a molding process or the covers can be joined by any other suitable means.

The cover 12 is joined to the web or binding 20 by means of a living hinge 24 and the upper cover 14 is joined by a second living hinge 26 thereto. The two respective living hinges 24 and 26 allow for the web 20 or binding to be flexed backwardly and forwardly and to open in the manner as described herein.

The web or binding 20 has an indexing member or wall 28 which allows the web when folded inwardly to be indexed with respect to a wall 30. The wall 30 surrounds the bottom cover 12 in a U shaped manner having a front portion 32 and two side portions 34 and 36. The side portions or walls 34 and 36 serve to enclose the disk memory units when they are folded downwardly, so that the disks 16 are completely surrounded and enclosed when the covers 12 and 14 are placed in overlying relationship to each other as seen in FIG. 2.

The living hinges 24 and 26 are of sufficient flexibility and resiliency so that they will not be easily torn. At the same time, they are of sufficient flexibility and thickness to allow for long term bending and usage thereof.

The covers 12 and 14 serve to hold and enclose a tray-like insert 40. The insert 40 comprises a tray-like member that has side walls 42 and 44 terminating in slanted leading surfaces respectively 46 and 48. The slanting leading surfaces 46 and 48 provide easy folding movement over the leading edge of the wall 32 so that it does not bind thereon when the container is being folded together.

The tray or insert 40 is formed with two openings 50 and 52 that are surrounded by an M shaped web 54. The M shaped web 54 has a lower surface attached to the bottom or end of the tray 56 which serves to allow the disks to rest thereon.

A pair of fan tabs 58 and 60 are connected to the bottom 56 and terminate in a rounded or smooth surface. The fan tabs 58 and 60 are flexible and bend from their ends to where they are attached to the bottom of the tray.

The fan tabs 58 and 60 are shown in a flexed or bent position in FIG. 1, whereby the magnetic memory disks 16 can be fanned and looked at with respect to each of the labels 18 on the upper left hand corner of each one. In other words, the showing of FIG. 1 is with the fan tabs 58 and 60 in displaced position in the manner of being fanned by hand.

The tray 40 is secured to the upper cover 14 by means of a pintal 70 which engages a slot 72 having a rounded opening 74 therein in the edge region of the cover 14. The slot 72 and rounded opening 74 are formed in a boss 76 which is molded into the side portion of the cover 14 to provide easy movement of the pintal 70 for pivotal swinging action. The entire swinging action afforded the cover 14 as hinged on the pintals 70 allows for movement so that it can swing backwardly into a position of being implaced within the container or enclosure. As can be seen in FIG. 4, the insert or tray is being moved backwardly and is in an overcenter position during the course of its movement to the folded position. The stop flange 28 serves to rigidify and hold the tray 40 from lateral movement and rigidifies the entire container when it is folded up.

Figure 9:
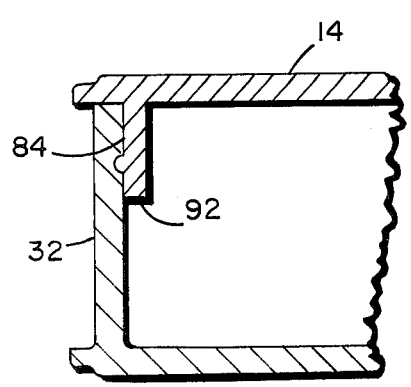
FIG. 9 shows a detailed sectional view of the locking portion as locked, of the enclosure as descrbed and circled through a section inscribed by circle 9 of FIG. 2.
Figure 10:
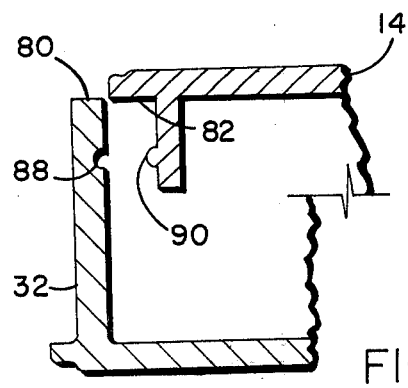
FIG. 10 shows the sectional detail of FIG. 9 in the unlocked condition.

Looking more particularly at FIGS. 9 and 10, a detailed showing of the locking mechanism as encircled by circle 9 of FIG. 2 is shown. In particular, the top 14 of the container is shown having a depending wall or spline 84. The depending wall 84 has an edge 92 along the front of the lid 14. A portion of the depending wall 84 has a bead 90. The bead 90 allows the depending wall 84 to be inserted or biased by the plastic memory of the material into a groove 88 that is in the upstanding wall 32. Thus, the top of the wall 32, namely top 80 is in close juxtaposition to the inside surface 82 and is forced internally by the flexible nature of the plastic of the bead 90 engaging groove 88.

Figure 11:
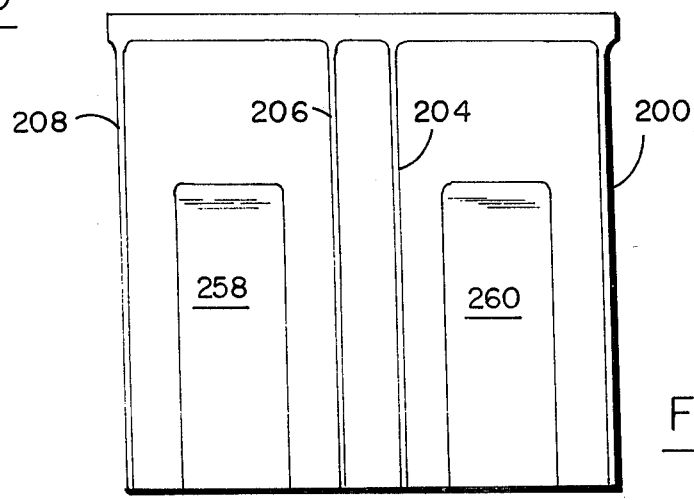
FIG. 11 shows an elevation view of the alternative embodiment shown in FIG. 8.

Looking more particularly at FIGS. 8 and 11, an alternative embodiment is shown wherein the like portions, namely the top 14 and the base 12 are utilized. However, the two respective portions employ a modified insert or tray. In particular, a tray 200 is shown having side walls 202, 204, 206 and 208. The two outer walls 202 and 208 are formed in the same manner as the side walls 42 and 44. In addition thereto, a pair of interior walls 204 and 206 are formed in the same manner as the outer side walls. In this manner, rectangular magnetic cards can be inserted into the rectangular slots that are provided.

A pair of tabs that form fan tabs similar to tabs 58 and 60 are provided. These tabs have been numbered 258 and 260 in respective correspondence to the showing of FIG. 1. All the other details of the invention are substantially the same in all respects as the showing of FIG. 1. This allows magnetic cards to be held within the rectangular pockets provided between the walls 202, 204, 206 and 208 behind the fan tabs 258 and 260, so that the entire series of magnetic cards can be implaced within the pockets and held thereby.

From the foregoing, it can be seen that this invention is a broad step over the prior art insofar as it provides storage for memory disks in an easy, facile and compact manner. As a consequence, the invention is to be read broadly in light of the following claims for covering the encapsulation, storage and containerization of magnetic memory disks or cards.

I claim:

1. A container for holding magnetic memory storage members comprising:

a first co-extensively unbroken cover;

a second co-extensively unbroken cover hinged to said first cover by a web similar to a book-like binding having at least one living hinge, to provide a space between said covers when they are in folded overlying relationship;

a tray-like insert pivotally attached to one of said covers to allow said insert to be folded inwardly between said first and second cover; and, said tray-like insert member having lateral side walls to prevent substantial movement of magnetic memory members stored therein with tabs overlying a portion of said tray to secure the magnetic memory members between the tabs and the base of said tray-like member in a manner to allow the tabs to be moved to provide access to the memory members stored therein.

2. The container as claimed in claim 1 further comprising:

flexible pivotal support means formed with a pintal for supporting said insert or tray in pivotal connected relationship.

3. The container as claimed in claim 2 further comprising:

a pintal formed as a portion of said container; and,
a rounded slot opening for receiving said pintal.

4. The container as claimed in claim 3 further comprising:

means for securing said first cover to said second cover at the upstanding walls between said covers in the form of a frictional engagement latch.

5. The combination of a magnetic memory storage member and a container for storing said memory comprising:

memory storage members;

a first co-extensively unbroken cover;

a second co-extensively unbroken cover hinged to said first cover in spaced relationship by means of a web providing in part a living hinge securing said first and second covers together so that they can be opened in a book-like manner;

a wall surrounding at least in part the general peripheral region of one of said covers in upstanding relationship therefrom for extending between a portion of said first and second covers when said covers are in overlying relationship to each other;

a tray-like member hinged to one of said cover s for folding inwardly so that when said first and second covers are in overlying relationship said tray-like member is implaced within said upstanding wall; and, flexible tabs overlying said magnetic memory storage members in said tray-like member 6. The combination as claimed in claim 5 wherein:
said magnetic memory members are magnetic cards 7. The combination as claimed in claim 5 wherein:
said magnetic memory storage members are magnetic disks.

8. The combination as claimed in claim 7 wherein:
said magnetic memory members are floppy disks.

* * * * *